No. 620,527. Patented Feb. 28, 1899.
W. W. WRIGHT.
COIN CONTROLLED VENDING MACHINE.
(Application filed Feb. 4, 1898.)

(No Model.) 7 Sheets—Sheet 1.

Fig. 1.

Witnesses:
Jas. E. Hutchinson.
Henry C. Hazard.

Inventor.
Walton W. Wright, by
Prindle and Russell, his Att'ys

No. 620,527. Patented Feb. 28, 1899.
W. W. WRIGHT.
COIN CONTROLLED VENDING MACHINE.
(Application filed Feb. 4, 1898.)

(No Model.) 7 Sheets—Sheet 3.

No. 620,527. Patented Feb. 28, 1899.
W. W. WRIGHT.
COIN CONTROLLED VENDING MACHINE.
(Application filed Feb. 4, 1898.)
(No Model.) 7 Sheets—Sheet 4.

Fig. 4.

Witnesses:
Jas. E. Hutchinson
Henry C. Hazard.

Inventor.
Walter W. Wright, by
Prindle and Russell, his Attys

No. 620,527. Patented Feb. 28, 1899.
W. W. WRIGHT.
COIN CONTROLLED VENDING MACHINE.
(Application filed Feb. 4, 1898.)
(No Model.) 7 Sheets—Sheet 5.

No. 620,527. Patented Feb. 28, 1899.
W. W. WRIGHT.
COIN CONTROLLED VENDING MACHINE.
(Application filed Feb. 4, 1898.)
(No Model.) 7 Sheets—Sheet 7.

Witnesses:
Jas. E. Hutchinson.
Henry C. Hazard.

Inventor.
Walton W. Wright, by
Prindle and Russell, his Attys.

UNITED STATES PATENT OFFICE.

WALTON W. WRIGHT, OF MEMPHIS, TENNESSEE.

COIN-CONTROLLED VENDING-MACHINE.

SPECIFICATION forming part of Letters Patent No. 620,527, dated February 28, 1899.

Application filed February 4, 1898. Serial No. 669,093. (No model.)

*To all whom it may concern:*

Be it known that I, WALTON W. WRIGHT, of Memphis, in the county of Shelby, and in the State of Tennessee, have invented certain new and useful Improvements in Coin-Controlled Vending-Machines; and I do hereby declare that the following is a full, clear, and exact description thereof, reference being had to the accompanying drawings, in which—

Letters of like name and kind refer to like parts in each of the figures.

Figure 1:
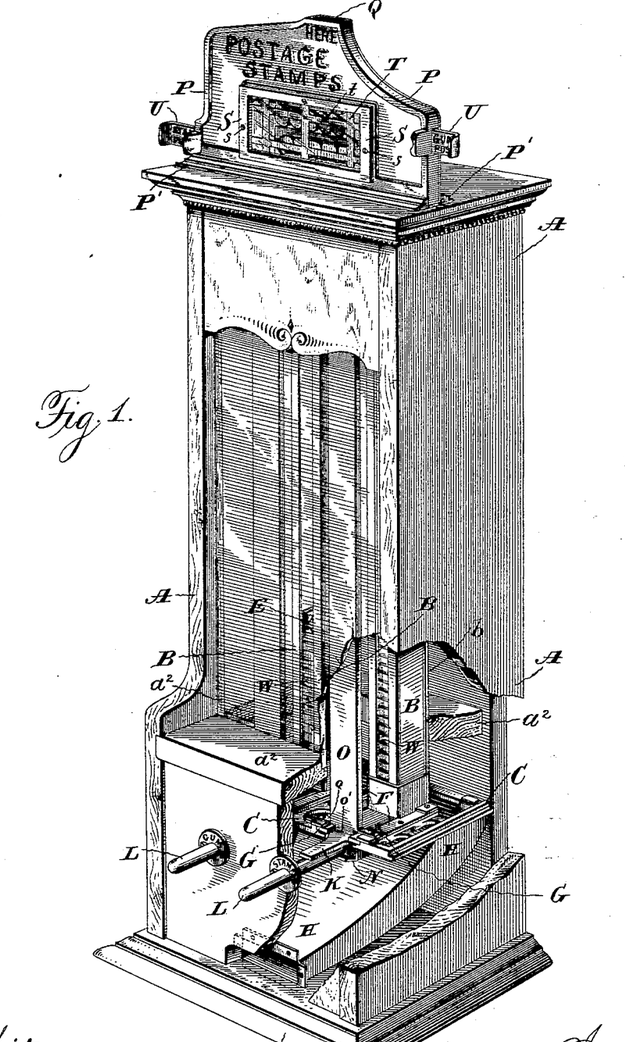
Figure 1 is a perspective view of a machine embodying my invention with parts of the casing broken away.
Figure 2:
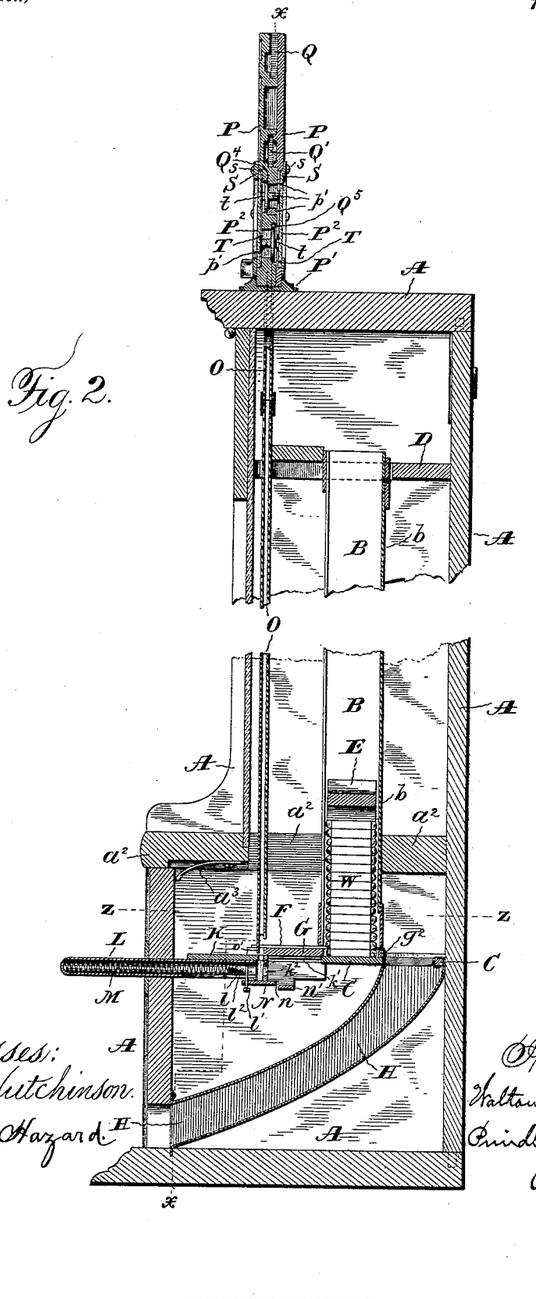
Fig. 2 is a vertical section on a plane passing from front to rear.
Figure 3:
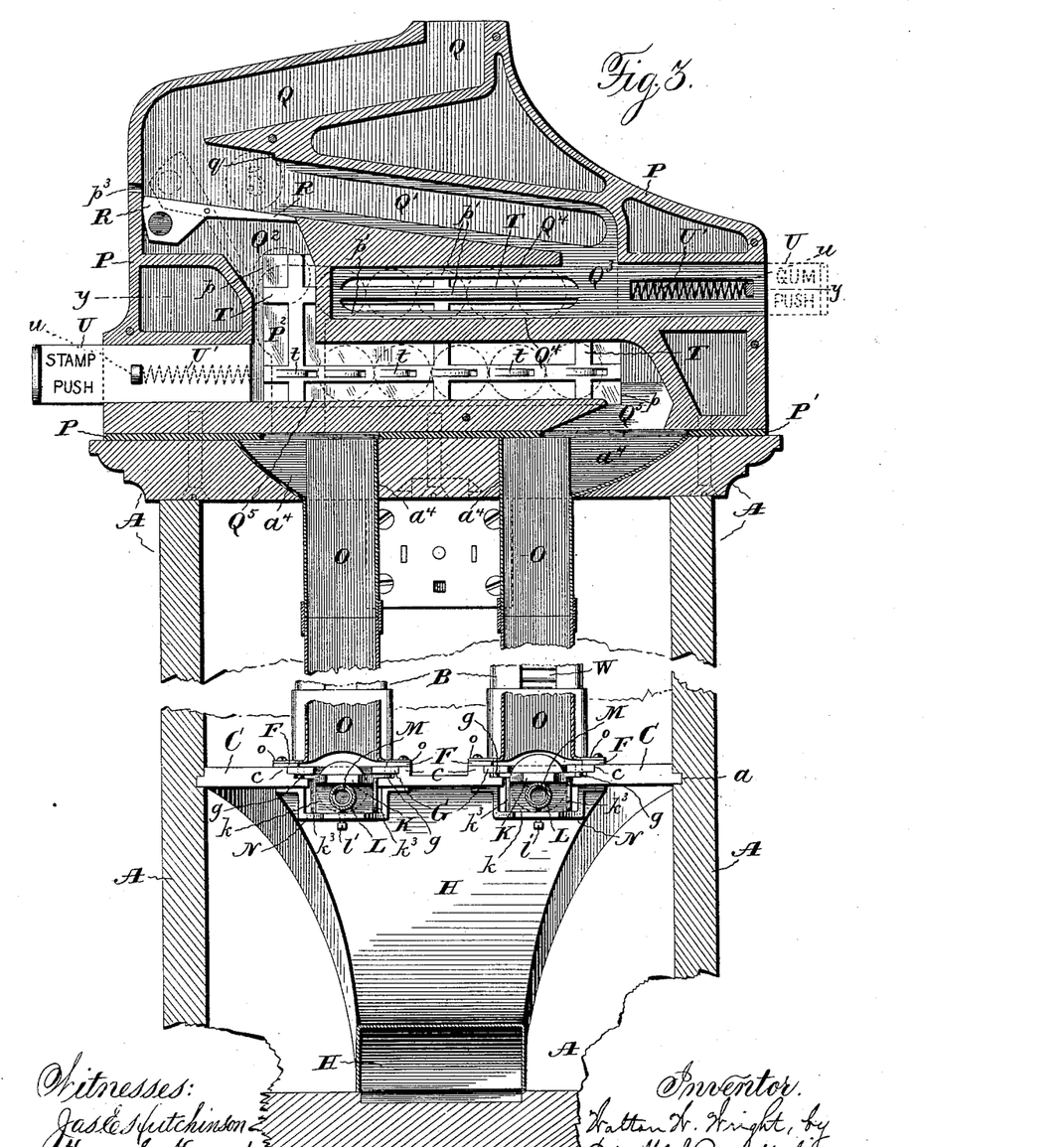
Fig. 3 is a section on the line x x of Fig. 2, drawn on a larger scale.
Figure 4:
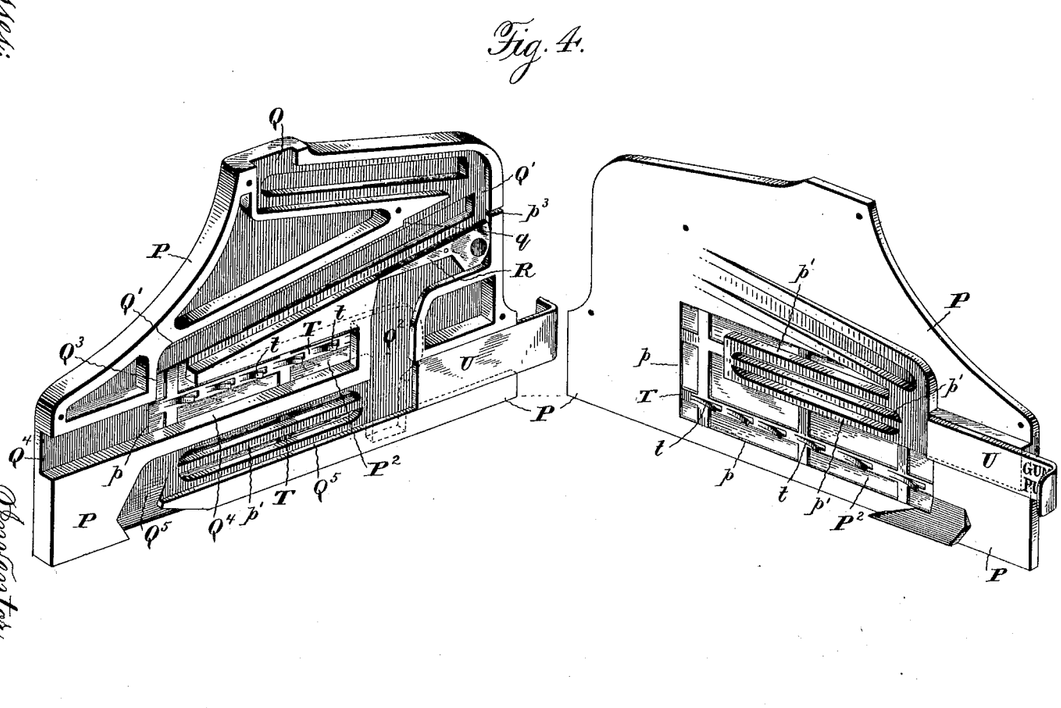
Fig. 4, a detail view in perspective of the parts of the coin exhibiting and separating mechanism separated from each other.
Figure 5:
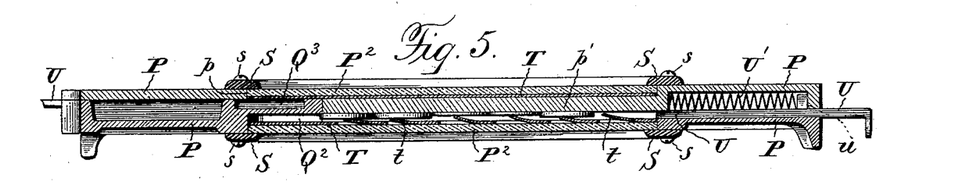
Fig. 5, a detail horizontal section on the line y y of Fig. 3.
Figure 6:
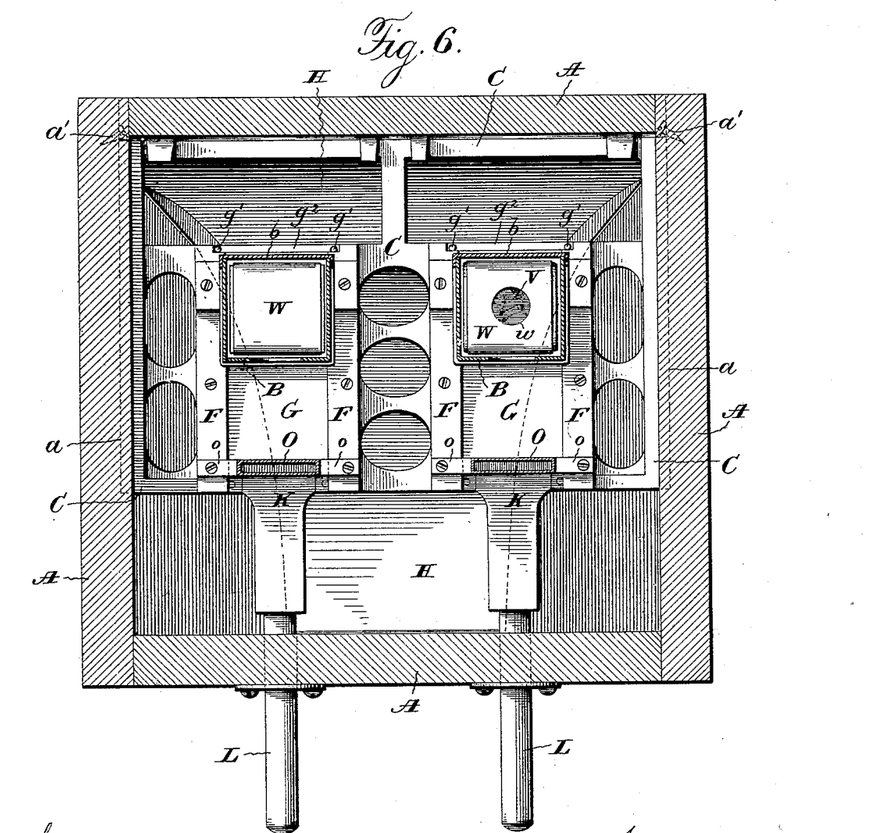
Fig. 6, a horizontal section on the line z z of Fig. 2.
Figure 7:
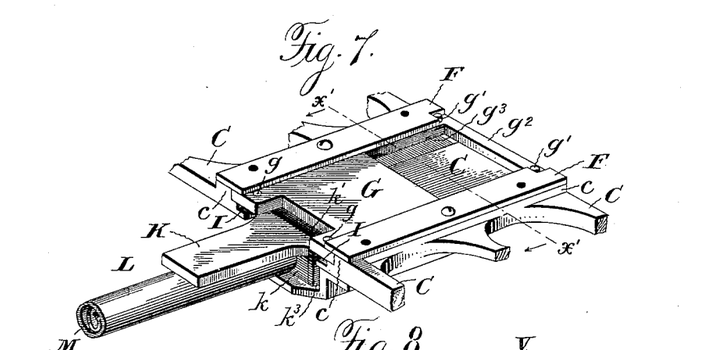
Fig. 7, a detail perspective view of the merchandise-ejecting device.
Figure 8:
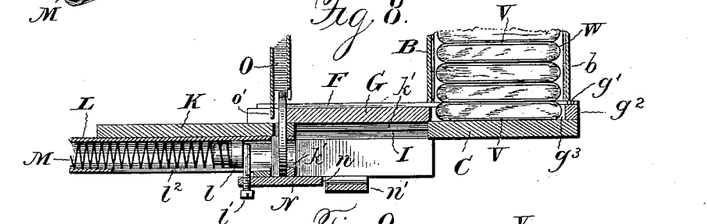
Figs. 8, 9, and 10 are longitudinal sections of said ejecting device, showing, respectively, the position of the parts immediately before the device is actuated, when the parts have been moved to a point where the coin locks the same against retraction and when the ejecting movement is completed.
Figure 9:
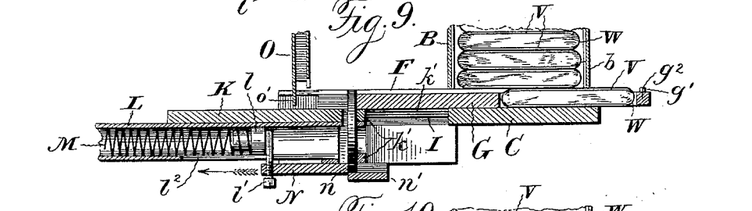
Figure 10:
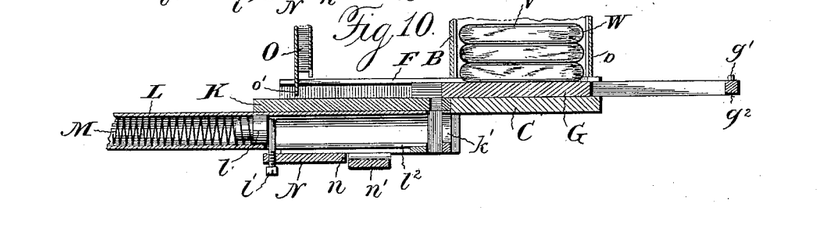
Figure 11:
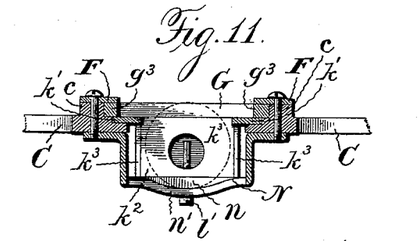
Fig. 11 is a section on the line x' x' of Fig. 7.
Figure 12:
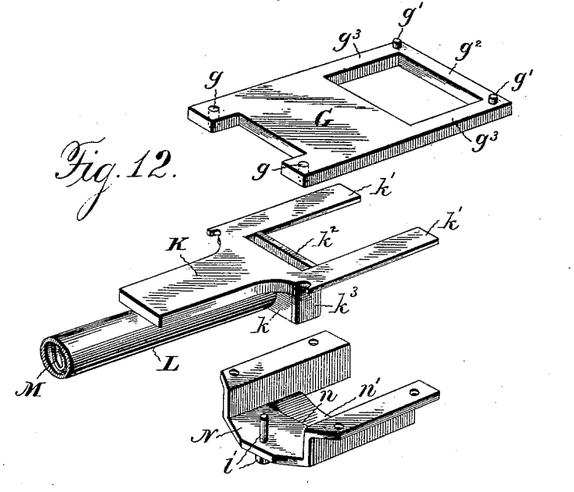
Fig. 12, a detail perspective view of certain parts of the ejecting mechanism separated from each other.
Figure 13:
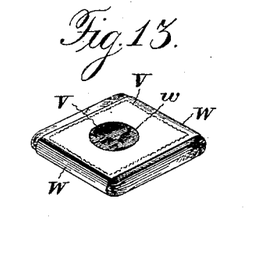
Figs. 13 and 14 are detail perspective views of one form of merchandise used in my machine, viewed from opposite sides.
Figure 14:
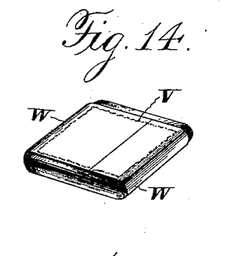

The object of my invention is to improve the construction of coin-operated vending-machines whereby they may be simplified, so as to cheapen their cost of manufacture and to diminish the likelihood of derangement from use, whereby the use of fraudulent devices and dishonest manipulation may be discovered, deterred, and prevented, and whereby commodities of different values may be dispensed by one machine; and to these ends said invention consists in the features of construction and arrangement hereinafter specified.

In the carrying of my invention into practice I mount the operative parts of my mechanism in a casing A, preferably of wood, with its front side partially of glass and its back removably held in place to permit access to the interior and secured by a key-actuated lock. Within said casing are two vertical merchandise-holding tubes B and B, that are supported at their lower ends by a horizontal base-plate C, which is fastened to the casing sides a suitable distance from the bottom thereof, having its opposite edges contained in grooves *a* and *a* in said sides and thereby supported. Said plate is slid into said grooves from the rear side, its front edge abutting against the ends thereof, and it is secured in this position by screws $a'$ and $a'$ or the like, that engage its rear edge. The upper ends of the tubes B and B pass through openings in a horizontal cross-piece D within the casing, near the top thereof, and are thereby sustained or supported. The front side of each tube is slotted vertically to expose its interior to view and its rear side *b* is removable to permit access to the interior. The merchandise for which the machine shown is intended is in the form of flat square tablets, and the cross-section of the tube corresponds to the square shape of the tablets. Within the tube, to rest on top of the column of tablets therein, is a weight E, to press or feed them down to the delivery devices to be presently described.

Mounted to slide in horizontal guides formed by two parallel ribs *c* and *c* upon the top of the base-plate C, on opposite sides of each tube and overhanging bars F and F, fastened to said ribs, is a plate G, whose path of travel is across the bottom of the tube, so that the lowermost tablet in the tube resting upon the base-plate will be in the path of the plate and, being engaged thereby, will be carried along with it from beneath the tube and off the rear edge of the base-plate, dropping into a delivery-chute H, that inclines downward and forward beneath said plate to the front of the machine, where its discharge opening or mouth is located. Mounted beneath the plate G in guides I and I in the base-plate C is a second plate K, on the under side of which is a lug *k*, to which is attached the end of a rod L, which extends therefrom outward through an opening in the front side of the casing A. Said rod L is tubular or hollow, and within it is a coil-spring M, one end of which bears against the inside of the outer end of said rod and the other end bears against a block $l$ in the rod that is held in position by a screw $l'$, which passes into the rod from below, being screwed through an opening in a fixed plate N, that is attached by flanged side pieces to the under side of the plate C. By the action of said spring the rod is yieldingly held in its outermost position. The outer edge of the plate G and the inner edge of the plate K stand in planes that are separated a distance a little greater than the thickness of the coin designed to effect the operation of the machine, and when a coin is in the space between said edges the movement of the plate K will be transmitted to the plate G. At each side the plate K has an arm or extension $k'$, that fits a guide I, so as to form extended bearings for the plate to firmly hold it against lateral movement that would cause it to stick or bind. Support against sidewise and up-and-down movement is also secured by the bearing of the push-rod in the casing-opening through which it passes.

The plate N is situated so that it forms a stop to insure that the coin passing into the space between the two plates G and K from a chute or tube O, placed with its lower end over said space when the parts are inactive, will not pass below said space, and its length is such that the coin cannot drop from between said plates G and K, but will be caught thereby until said plates have moved sufficiently far to insure the delivery of the piece of merchandise. The grip on the coin by the two plates G and K when pressure is applied to the rod L to eject the merchandise is sufficient to hold the coin, but obviously the relaxing of pressure on said rod would cause the freeing of the coin, and it is to meet this contingency that the plate N has the length above mentioned.

The plate G having been moved in one direction by the intervention of the coin, said plate when the coin is released is moved in the opposite direction to position for another delivery operation by means of pins $g$ and $g$ on its bottom, at opposite sides of its front end, that are engaged by the forward edge of the plate K. Thus the outward travel of the plate K under the action of the spring M will be accompanied by a like movement of the plate G. To stop the latter when thus moved, its end opposite that carrying the pins $g$ and $g$ is provided on each side with an upwardly-projecting pin $g'$, that strikes against the end of the adjacent guide F. Two stop-pins are provided, as one would be inadequate to long stand the wear to which it would be subjected, and to provide for the contingency of injury to both of said pins, so that they would be inoperative, the screw $l'$ is arranged to serve as a stop by the engagement therewith of the rear end of the slot $l^2$, that is provided in the rod L. The other end of said slot may serve, in connection with said screw, to limit the travel of parts when the rod is pushed inward; but I preferably employ for this purpose the abutting of the forward edge of the plate G with the base-plate C.

To prevent fraudulent or dishonest manipulation of the machine, so as to get more than one piece of merchandise for one coin, by pushing the delivery devices far enough inward to discharge the piece of merchandise and yet not carry the coin off the plate N, so that the delivery-plate G might be repeatedly moved by means of the same coin to eject pieces of merchandise, I have provided means to prevent the retraction of the delivery devices after they have been moved only part of the way to effect the delivery of the piece of merchandise and before they have been moved far enough to complete such delivery, so that movement of said devices to an extent that will produce the release of the coin will be necessary to complete the delivery of the piece of merchandise. Said means consist simply of a vertical shoulder $n$ in the plate N, formed, preferably, by depressing a part of said plate at $n'$, said depressed part being the latter portion of the plate-surface over which the coin passes. Thus, when the coin has been moved to a point past the shoulder $n$, and the pressure on the rod L is released, with a view to retracting the delivery devices, the coin will drop into contact with said depressed portion and will strike against the shoulder, locking the devices against further backward movement. The coin is supported in a vertical position when thus moved against the shoulder $n$ by a vertical plate $k^2$, carried by the plate K, being connected with the latter and supported the necessary distance from its coin-engaging edge by parallel right-angled arms $k^3$ and $k^3$, that are fastened to opposite sides of the lug $k$.

As a further precaution against the delivery of merchandise without complete inward movement of the plate G, by tilting the machine after a partial ejection of the merchandise, so as to cause the latter to drop off the base-plate, a bar $g^2$ is placed in advance of the merchandise-engaging edge of the plate G a distance equal to the width of the piece of merchandise, being attached to or carried by parallel extensions $g^3$ and $g^3$ from the sides of said plate. In form this construction is thus that of a plate with an opening in it of the size and shape of the piece of merchandise. It will be apparent that nothing could be accomplished by tilting the machine, as the piece of merchandise would fall against and be arrested by the bar $g^2$.

The plate K is extended from its coin-engaging edge a distance at least slightly greater than the amount of its travel, so that at all times during its ejecting movement it will be beneath the coin chute or tube in position to support a coin should such be dropped down the chute before the completion of such ejecting movement. Such succeeding coin could thus not interfere with the working of the machine, and on the completion of the reverse movement of the plate K would simply fall into position to produce the proper operation of the delivery device.

The coin-tube O has on opposite sides laterally-projecting feet $o$ and $o$, by which its lower end is fastened to the base-plate C. On the side toward which the coin is moved when the delivery devices are operated it is cut away to permit its unobstructed passage and on its opposite side it has a downward extension $o'$, that reaches close to the top of the plate K to prevent the escape of a coin in the direction of such side by its rebound when falling onto the plate N.

I prefer the construction shown and described, whereby to effect the delivery of the merchandise it is necessary to push inward upon the rod L; but obviously by simply reversing the position of the parts and extending the arms $k'$ and $k'$ of the plate K and forming such extension into a handle an outward pull instead of an inward push could be the mode of operation.

A short distance above the base-plate there is a horizontal partition composed of two abutting pieces $a^2$ and $a^2$ whose ends fit within in grooves cut in the inner sides of the two sides of the casing A. One of said pieces is put in place from the front and has a spring-latch $a^3$, that catches against the inside of the casing front, and the other piece is put in place from the rear.

Mounted upon the top of the casing A is a frame composed of two plates P and P, that abut on a vertical plane and are fastened together by screws or rivets and by having their lower edges placed within a groove in the upper side of a bar P', resting upon the casing-top, and there held, and the two plates held in the bar by screws that pass from the bottom of the casing-top upward into one of the plates. Formed in one of the plates P in its side adjacent to the other plate is a coin-passage Q that, starting at the top of the plate, extends straight downward and then inclines downward and to one side. From this point the passage divides, one part Q' thereof being carried on in a straight line at a downward incline toward the other side of the frame and the other part $Q^2$ dropping directly downward. Pivoted in the latter part is a plate or bar R, that is weighted on one side of its pivot to cause its upper straight edge to extend in line with the bottom of the passage Q' and in position to close the passage $Q^2$. Said weighted bar is caused to occupy this position by the engagement of a portion of its weighted side with an adjacent part of the plate that limits the upward movement of the passage-closing part of the bar, while leaving it free to be swung downward. Just above the passage-closing part of the bar R the upper wall of the coin-passage is provided with a shoulder $q$, formed by contracting the width of the passage, which will engage and arrest a coin, such as a nickel, too large to pass said shoulder and bringing the same to a stop on the pivoted bar. The latter, being weighted to yield to the weight of a nickel, will swing down and permit the nickel to pass through the passage $Q^2$. A coin, such as a cent, being too small in diameter to touch the stop-shoulder $q$ and too light to operate the gate-bar will pass both and travel on through the passage Q'.

The passage Q' is connected by a short vertical way $Q^3$ with a way $Q^4$, that extends horizontally across the frame-plate, and the passage $Q^2$ connects with a like horizontal way $Q^5$, which leads in the opposite direction from the other and being in different horizontal and vertical planes. Each of said horizontal ways communicates at its extremity by a downwardly-extending passage with the upper end of one of the coin-tubes O, the latter being passed through a slot $a^4$ in the casing-top. Said slot $a^4$ being extended to one side beyond the side of the tube, I open the side of the tube for the entrance of the coin by slitting the tube vertically at the side and use the portion of the side thus separated as the bottom or facing of the slot by bending said portion to the required position.

The necessity for placing the two ways or passages in different vertical planes arises from the circumstance that portions thereof lie in the same horizontal planes. It will be noted that this arrangement in different horizontal planes is produced by inclining the passage Q' horizontally, as well as downwardly.

Through each frame-plate P there is cut an opening $p$ in the form of a parallelogram, which is covered by a piece of glass $P^2$, that fits said opening and is secured therein by a frame S, that is removably secured on the outside of the plate by means of screws $s$ and $s$. The openings in the two plates come opposite each other, and they have such length, height, and position that the two horizontal ways $Q^4$ and $Q^5$ are exposed, so that coins in each of said ways are visible from both sides. One side of each of said ways is in the form of three parallel horizontal separated surfaces or bars $p', p'$, and $p'$—an upper and lower and a middle one—while the opposite side of the way consists of a thin bar T, placed parallel with the middle one of the three bars $p'$ and provided with a series of spring tongues or fingers $t$ and $t$, that press toward said middle bar and have their free ends pointing in the direction of travel of the coins along the way. The function of the springs is twofold. They prevent any retrograde movement of the coins should it be attempted to withdraw them by manipulating the machine for such purpose, and they press the coins against the opposite middle bar $p'$, so that the same sides of all of the coins are in the same plane. It is therefore impossible should the thickness of each of two adjacent coins be less than the width of the way for one coin to be forced or pressed alongside of another and the way choked or clogged thereby. The middle bar $p'$ is also important in this connection, as by engaging the coin for its entire diameter it is impossible for the coin to rock or turn in a horizontal direction.

The bar having the spring-tongues is preferably a part of a frame T', composed of two horizontal and three vertical members, that is placed next the inner face of the piece of glass, the upper horizontal member being provided with the springs in one frame and the lower member with the springs in the other frame. Viewed from either side a row of coins in one way is partially covered only by the bar T and the other row by the three parallel surfaces or bars $p'$ and $p'$, enough of the coins, however, being visible to enable it to be readily seen whether or not genuine coins and not slugs or other substitutes have been used.

Mounted in a horizontal guideway, in line with each coinway $Q^4$ and $Q^5$, is a slide U in the form of a flat plate, with one end projecting outside the frame-plates and bent at a right angle. On one side of said plate is a lug $u$, that is engaged by one end of a spring U', placed in a cavity $p^2$ in the frame-plate, which spring presses and holds said slide yieldingly outward. As the amount of movement of the slide is just equal to the diameter of a coin, it follows that if there be a row of coins filling the way and the slide be pushed inward the last coin in the row will be pushed from the way and will drop into and through the coin-tube to the proper merchandise-delivery device.

Above but close to the pivoted gate-bar R there is a small hole $p^3$ through the end of one of the frame-plates P in line with the coin-passage Q', through which a small rod or wire may be passed to force through said passage any coin that by reason of being bent or irregular in shape might lodge in the passage. Having been forced through the latter and reaching the horizontal way $Q^4$, such coin can be readily gotten at and taken out by removing the piece of glass $P^2$ and frame T'. The object of placing said hole $p^3$ close to the gate-bar is to prevent the latter being reached and opened for the passage of coins less in value than are intended therefor.

For the sake of economy in manufacture the two sets of mechanisms, comprising each a coin and a merchandise tube and the delivery devices therefor, are duplicates, it being possible so to make them, although respectively designed for use with coins of different denominations.

The merchandise to be vended by the machine herein shown and described is chewing-gum alone, placed in the tube from which it may be delivered by cents, and chewing-gum and two-cent postage-stamps placed in the other tube and deliverable therefrom by nickels, a piece of gum and two stamps being placed together in a single package, the gum being wrapped in paper, as usual, and a stamp V placed on each of its opposite sides when wrapped and confined by a strip of paper W, the ends of which are overlapped and pasted together. Preferably a hole $w$ is cut through the paper W to expose one of the stamps and permit the finger to be placed upon the stamp to slide it from beneath the paper, said hole being centrally located or, if preferred, being in the form of a notch in the edge of the paper. The other stamp will be gotten at by tearing off the wrapping-paper W. It is apparent that if the gum is not used before the second stamp is used the arrangement described forms a most convenient one for carrying the stamp in the pocket and protecting it. By the provision of no hole over the second stamp it is completely covered and protected by the wrapping-paper from being soiled. The wrapping-paper W is made transparent, so that the stamps may be visible through it; but of course opaque paper can be used, if preferred.

The operation of the machine shown and described is as follows: Enough coins of the proper denominations are placed in the respective ways $Q^4$ and $Q^5$ to reach from the slides U and U when pressed inward to the opposite ends thereof, so that when the slides are retracted there will be a space between the end of each slide and the first coin in the row equal to the diameter of the coin. Now if a cent be dropped in the slot Q it will roll on edge down to and over the gate-bar R, finally reaching the way $Q^4$ opposite the slide and in line with the row of cents therein. On pushing the slide inward, the entire row of cents will be moved along a distance equal to the diameter of the cent, and the last one in the row will be moved out of the way $Q^4$ into the way descending therefrom to the coin-tube O, through which it drops to the plate N in the space between the adjacent edges of the plates G and K. The push-rod L is now pressed inward, and the plate K, engaging the coin, will press it against the plate G, causing the latter to move, carrying with it the lowermost tablet of gum in the tube and ejecting it into the chute H, by which it will be delivered to the customer. Pressure being removed from the push-rod L, the grip on the cent will be released and the cent will drop on the top of the chute H and pass to the bottom of the casing. If a nickel be dropped into the slot Q, it will follow the same course as the cent until it meets the shoulder $q$ and comes on the gate-bar R, tipping which it will pass into the passage $Q^2$ and thence to the horizontal way $Q^5$, stopping opposite the inner end of the slide U. The latter being pushed inward, the whole row of nickels will be moved, and the last one in the row will be moved out of the way and thence, like the cent, fall to the delivery devices for effecting the delivery of the five-cent package, which is effected in a way precisely like that in which the cent package is.

It will be apparent that the instant a coin reaches its particular horizontal way it becomes visible from either side of the machine and remains visible until the machine has been operated the number of times required to move it from the entrance end of the way to its exit end. Ample opportunity is thus afforded for detecting the use of false coin or fraudulent substitutes and for fixing upon the person guilty of the act, and there is the advantage not only in enabling the apprehending of the guilty person, but the fact that the coin used is displayed after being put in the machine will deter persons from using fraudulent devices for fear of being discovered.

It is to be understood that my particular construction of delivery mechanism is capable of use without the employment of the detecting and separating mechanism and that the latter can be used with other forms of delivery mechanism. It is also apparent that the feature of displaying or exhibiting the coins after their introduction into the machine is capable of use where coins of but one denomination are used, and I do not limit myself to the vending of any particular commodity or merchandise, as my devices are capable of use for the sale of a variety of things.

Having thus described my invention, what I claim is—

1. In a vending-machine, the combination of a base-plate having two sets of horizontal guides, two sliding plates, mounted respectively, in said guides, means for directing a coin between adjacent ends of the plates, and a shouldered, coin-supporting plate, supported beneath the others by sides that are fastened to the base-plate, substantially as and for the purpose described.

2. In a vending-machine, the combination of a base-plate having two sets of horizontal guides, two sliding plates mounted, respectively, in said guides, a chute for directing a coin between adjacent ends of the plates, a tubular push-rod, containing a retracting-spring, attached to the under side of the lower one of said sliding plates, the portion of the plate over said rod being of such length as to be beneath the coin-chute when the push-rod is moved inward, and a coin-supporting plate, supported beneath the others by sides that are fastened to the base-plate, substantially as and for the purpose described.

3. In a vending-machine, the combination of a base-plate having two sets of horizontal guides, two sliding plates mounted respectively, in said guides, a chute for directing a coin between adjacent ends of the plates, a tubular push-rod attached to the under side of the lower one of the sliding plates, a spring within said rod, engaging the same at one end, a coin-supporting plate supported beneath the others by sides that are attached to the base-plate, and a screw or pin projecting from the coin-supporting plate, against which the pressure of the spring comes, substantially as and for the purpose described.

4. In a vending-machine, the combination of a plurality of releasing mechanisms, a coinway leading to each mechanism, a portion of which is horizontal, and of such length as to hold a series of coins, and constructed to display the coins therein, an inlet common to all of the coins, and a coin-separating mechanism, receiving the coins from such inlet, substantially as and for the purpose specified.

5. In a vending-machine, the combination of a plurality of releasing mechanisms, a coinway leading to each mechanism, a portion of which is horizontal and of such length as to hold a series of coins, and constructed to display the coins therein, a slide movable in line with the horizontal portion of each way, an inlet common to all of the coins, and a coin-separating mechanism, receiving the coins from such inlet, substantially as and for the purpose described.

6. In a vending-machine, the combination of releasing mechanism, a coinway leading to the latter, in a portion of which a number of coins at a time are detained, and means for yieldingly pressing each coin in its entire passage through such portion, against one side of the way, substantially as and for the purpose set forth.

7. In a vending-machine, the combination of releasing mechanism, a coinway leading to the latter, having a horizontal portion of such length as to contain a row of coins edge to edge, and means for yieldingly pressing each coin in its entire passage through such portion, against one side of the way, substantially as and for the purpose shown.

8. In a vending-machine, the combination of releasing mechanism, a coinway leading to the latter having a horizontal portion of such length as to contain a row of coins edge to edge, and means for pressing each coin, in its entire passage through such portion, against one side of the way, consisting of a series of spring-fingers, substantially as and for the purpose specified.

9. In a vending-machine, the combination of two releasing mechanisms, a frame having coinways leading to such mechanisms, portions of the two ways being horizontal, and in different horizontal planes, and constructed to expose the coins therein, an inlet common to the coins for said ways, and means for separating the coins for the respective ways, substantially as and for the purpose described.

10. In a vending-machine, the combination of two releasing mechanisms, a frame having coinways leading to such mechanisms, portions of the two ways being horizontal, and in different horizontal planes, and glazed on both sides, an inlet common to the coins for said ways, and means for separating the coins for the respective ways, substantially as and for the purpose set forth.

11. In a vending-machine, the combination of two releasing mechanisms, a frame having coinways leading to such mechanisms, portions of the two ways being horizontal and in different horizontal planes, and constructed to expose the coins therein, an inlet common to the coins for said ways, means for separating the coins for the respective ways, and a coin-moving slide in line with the horizontal part of each way, the two slides being opposite each other and operating to move the coins in the two ways in opposite directions, substantially as and for the purpose shown.

12. In a vending-machine, the combination of releasing mechanism, a coinway leading to such mechanism in a portion of which a number of coins at a time are detained, surfaces forming the sides of such portion that extend lengthwise thereof, that have contact with the central portions of the coins, the latter above and below such surfaces being visible, and one of such surfaces for the entire length of such portion of the way, pressing yieldingly toward the other surface, substantially as and for the purpose described.

13. In a vending-machine, the combination of means for delivering commodities of different value, for different coins, a passage common to the different coins that divides into separate passages, each of which has a horizontal portion, a pivoted bar in one of the divisions, over which coins for the other division pass, and which yields under coins for the division in which it is placed, and means for moving the coins along each of said horizontal portions, substantially as and for the purpose shown.

14. In a vending-machine, the combination of means for delivering commodities of different value, for different coins, a passage common to the different coins, that divides into separate passages, each of which has a horizontal portion with exposed sides, a pivoted bar in one of the divisions, over which coins for the other division pass, and which yields under coins for the division in which it is placed, and a slide in line with each of said horizontal portions, substantially as and for the purpose specified.

15. In a vending-machine, the combination of means for delivering commodities of different value, for different coins, a frame having a passage common to the different coins, that divides into separate passages, a movable bar closing one of the latter, and an opening through the frame in line with the other passage close to the movable bar and extending in a line other than the direction of movement of said bar, to permit access by a wire or the like, to coins stopping therein, substantially as and for the purpose described.

In testimony that I claim the foregoing I have hereunto set my hand this 28th day of January, 1898.

WALTON W. WRIGHT.

Witnesses:
EMERY GROVER,
EDWARD SULLIVAN.